Figure 1:
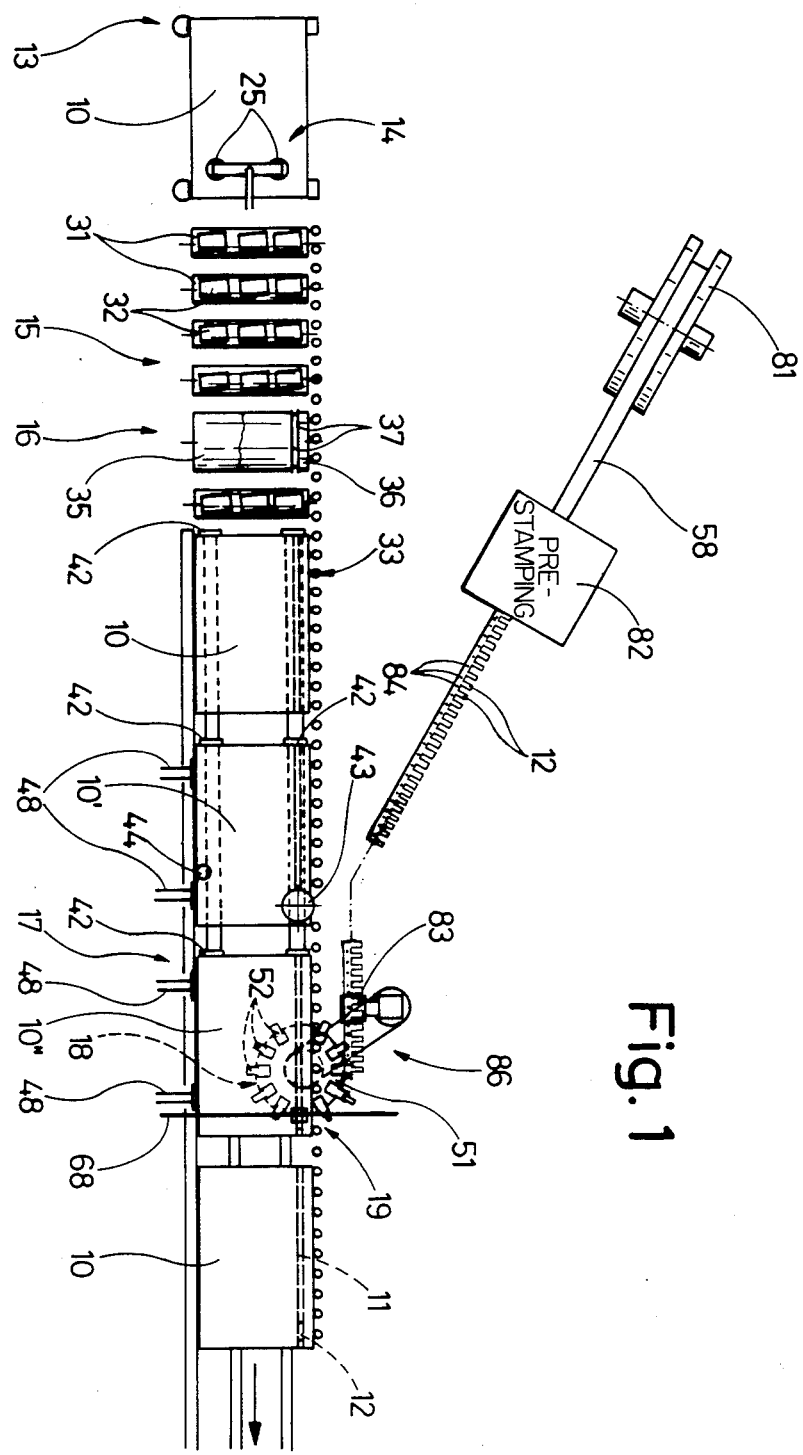

United States Patent

Kramer

[11] Patent Number: 4,714,814
[45] Date of Patent: Dec. 22, 1987

[54] WELDING MACHINE FOR WELDING TONGUES ONTO SHEET-METAL MEMBERS

[75] Inventor: Felix Kramer, Friedlisberg, Switzerland

[73] Assignee: Elpatronic AG, Switzerland

[21] Appl. No.: 924,065

[22] Filed: Oct. 28, 1986

[30] Foreign Application Priority Data

Oct. 30, 1985 [CH] Switzerland .............. 4672/85

[51] Int. Cl.⁴ .................. B23K 9/12; B23K 11/00; B21D 51/44
[52] U.S. Cl. ..................... 219/79; 219/80; 228/47; 413/66
[58] Field of Search ............ 219/79, 80, 86.7, 64, 219/67; 413/12, 14, 15, 66, 67; 220/274; 228/4.1, 47

[56] References Cited

U.S. PATENT DOCUMENTS

| | | | |
|---|---|---|---|
| 546,146 | 9/1895 | Gould | 413/66 |
| 2,681,968 | 6/1954 | Renard | 219/80 |
| 2,806,628 | 9/1957 | Morrill et al. | 413/66 X |
| 3,196,817 | 7/1965 | Fraze | 413/66 |
| 3,550,546 | 12/1970 | Eickenhorst | 413/66 |

Primary Examiner—Clifford C. Shaw
Assistant Examiner—C. M. Sigda
Attorney, Agent, or Firm—McCormick, Paulding & Huber

[57] ABSTRACT

Sheet-metal members (10), particularly tear-open can members, can be moved rhythmically, one behind the other, through a welding station (19) by a sheet-metal conveyor (15) and located in a defined position (17) in the welding station (19) by a positioning device (17). A prestamped tongue (12) can be punched-off from a sheet-metal strip (58) each time by a punch (60) over one of a plurality of receivers (52) on a tongue conveyor (18). The receivers (52) can be moved in succession out of the range of action of the punch (60) into the welding station (19) as a result of which the tongues (12) can each be laid against a sheet-metal member (10) in the welding station (19) in time with the sheet-metal conveyor (15). The punch (60) for punching off the tongues (12) is preceded by a prestamping device (82) which impresses markings (84) in the sheet-metal strip (58) at fixed distances from the tongues (12).

Disposed between the prestamping device (82) and the punch (60) is a drive member (83) which engages the markings (84) in the sheet-metal strip (58) and is connected to the tongue conveyor (18) by a transmission (86). The punch (60) is connected to a centering device (90) which engages in at least one marking (84) adjacent to it in the sheet-metal strip (58), during the punching off of a tongue (12). In this manner, the tongues (12) are each particularly accurately positioned in relation to the associated sheet-metal member (10).

6 Claims, 5 Drawing Figures

WELDING MACHINE FOR WELDING TONGUES ONTO SHEET-METAL MEMBERS

The invention relates to a welding machine for welding tongues onto sheet-metal members, particularly tear-open can members, having a sheet conveyor whereby sheet-metal members can be moved rhythmically through the welding station, one behind the other, a positioning device whereby the sheet-metal members can be located in a defined position in the welding station, a punch for punching off a prestamped tongue from a sheet-metal strip and a tongue conveyor which comprises at least one receiver for a tongue which can be moved out of the range of action of the punch into the welding station, as a result of which the tongues can each be laid on a sheet-metal member in the welding station in time with the sheet-metal conveyor.

Such a welding machine is the subject of the Applicant's earlier U.S. patent application Ser. No. 840,440 of Mar. 17, 1986 which is not a prior publication.

It is the object of the present invention to develop a welding machine of this type further in such a manner that it is able to weld the tongues onto the sheet-metal members in a particularly accurately positioned manner.

According to the invention, this problem is solved in that the punch for punching off the tongues is preceded by a prestamping device which impresses markings in the sheet-metal strips at fixed distances from the tongues, disposed between the prestamping device and said punch is a drive member which detects the markings of the sheet-metal strips and is connected by a gear train to the tongue conveyor, and said punch is connected to a centring device which, during the punching off of a tongue, engages in at least one marking of the sheet-metal strip adjacent to it.

The welding machine according to the invention is preferably further developed in accordance with at least one of the sub-claims.

One example of embodiment of the invention is explained below, with further details, with reference to diagrammatic drawings.

Figure 2:
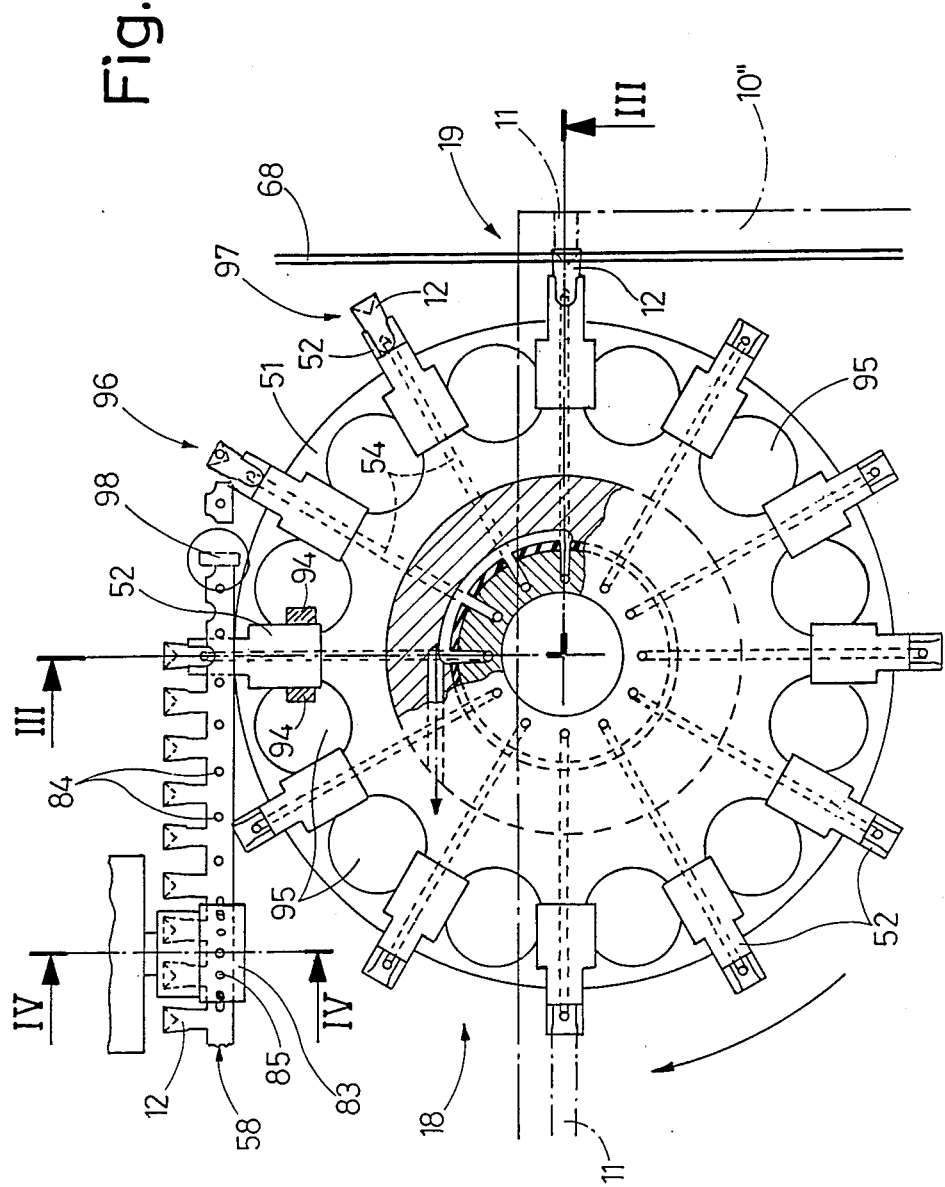
Figure 3:
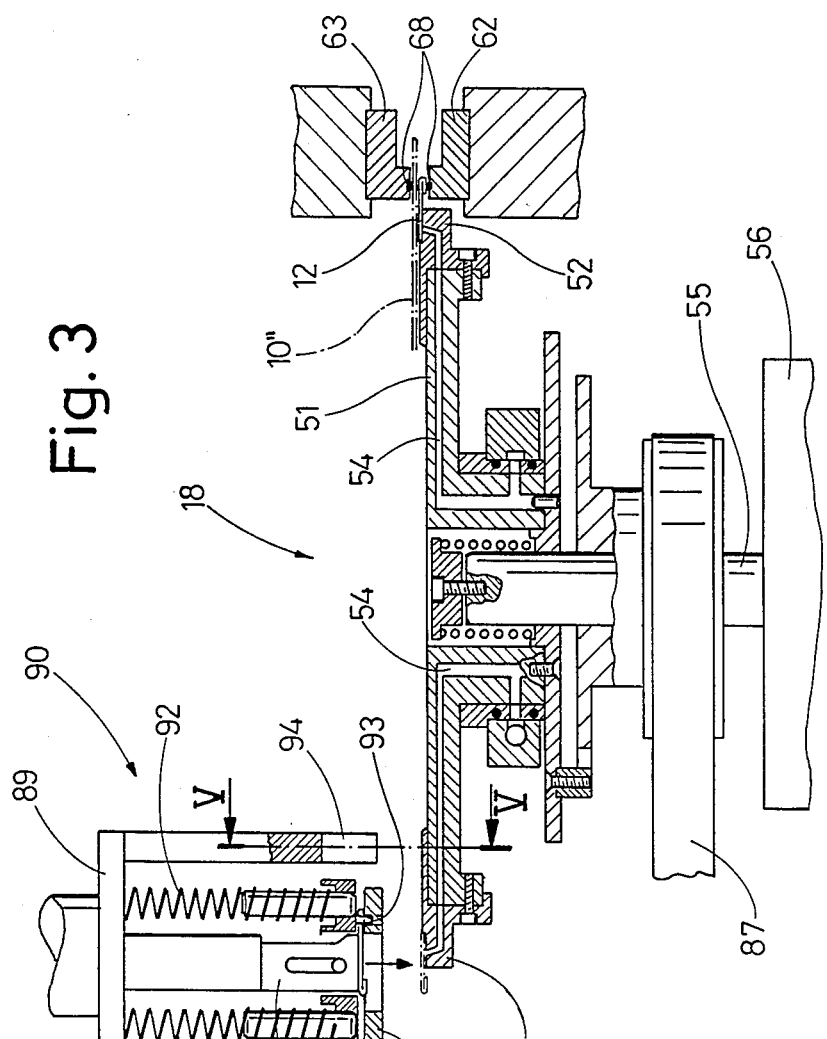
Figure 5:
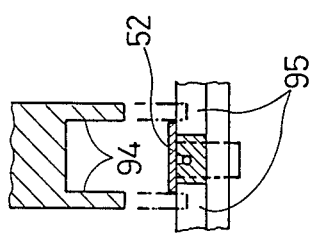
Figure 4:
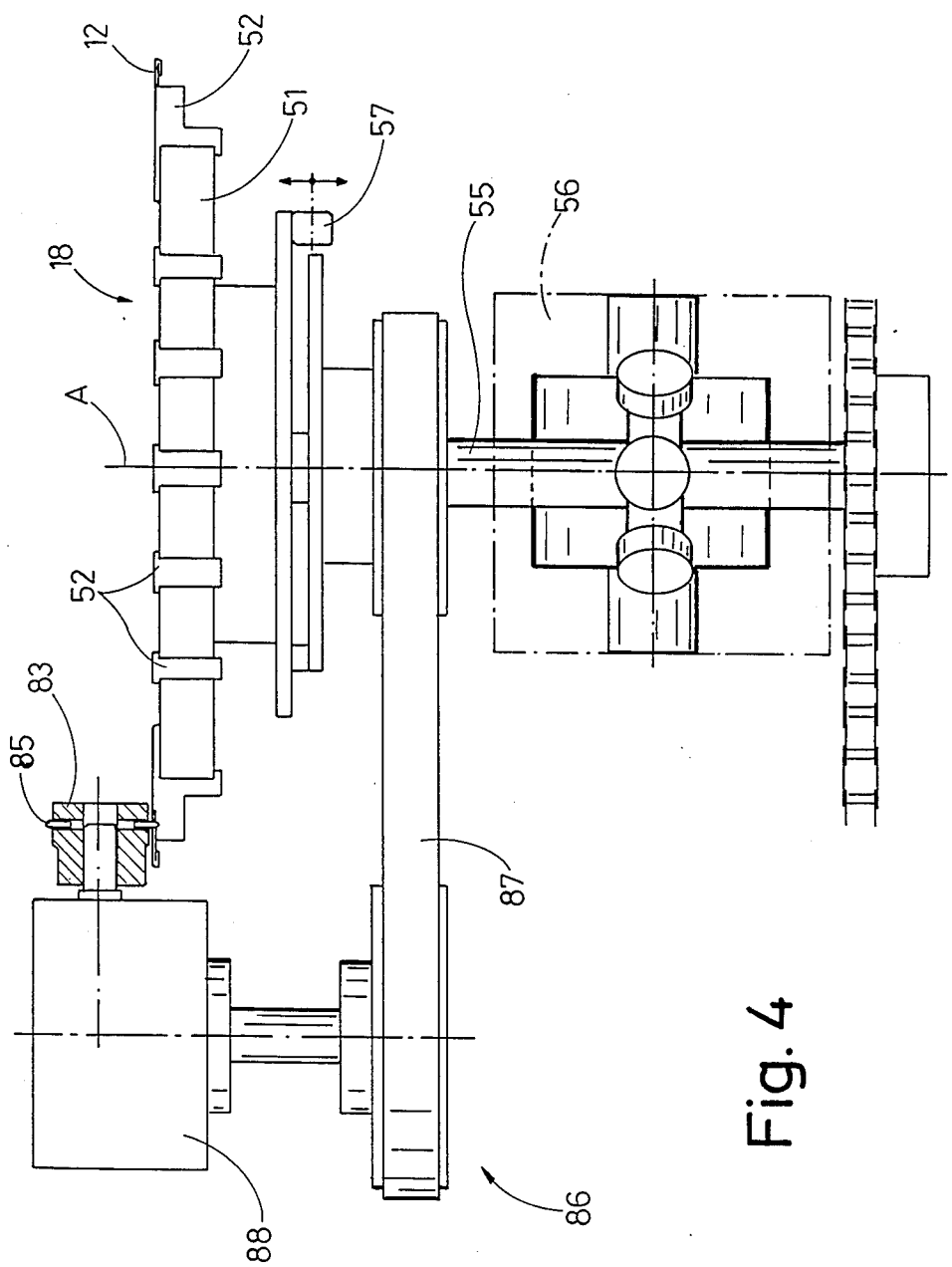

FIG. 1 shows the plan view of a welding machine according to the invention,
FIG. 2 shows an enlarged detail from FIG. 1,
FIG. 3 shows the vertical section III—III in FIG. 2,
FIG. 4 shows the vertical section IV—IV in FIG. 2 and
FIG. 5 shows the vertical section V—V in FIG. 3.

The welding machine illustrated serves the purpose of providing each rectangular sheet-metal member 10 of tin plate 0.2 mm thick for example with a tear-off strip 11 parallel to the longitudinal sides of the sheet-metal member and welding a tongue 12 to one end of the tear-off strip. Associated with the machine is a magazine 13 in which the sheet-metal members 10 are kept stacked. Disposed above the magazine 13 is a destacker 14 and this is followed by a sheet-metal conveyor 15 which conveys the sheet-metal members 10 further, in succession, in a horizontal plane. Associated with the sheet-metal conveyor 15 is an impressing station 16 for impressing the tear-off strips 11 and this is followed by a positioning device 17 which holds the sheet-metal members 10 successively in a precisely predetermined position within the range of action of an impressing tool 43, an tongue conveyor 18 and a welding device 19.

The destacker 14 is pneumatically controlled and has a pair of suction cups 25 which, at the beginning of each working cycle of the welding machine, are attached by suction to the top of the uppermost sheet-metal member 10 stored in the magazine 13, pull this sheet-metal member upwards out of the magazine and deposit it on the sheet-metal conveyor 15.

The sheet-metal conveyor 15 comprises a plurality of groups of lower rollers 31 and upper rollers 32, each of which is rotatable about a horizontal axis. The axes of the lower rollers 31 extend at right angles to the longitudinal edges of the sheet-metal members 10; the upper rollers 32 are disposed at a small angle to the lower rollers 31 in such a manner that they hold each sheet-metal member 10, travelling through between the rollers 31 and 32, bearing against a lateral boundary 33 by one of its two longitudinal edges. The lateral boundary 33 is formed by a rectilinear row of vertically mounted rollers, as indicated. The lower rollers 31 are mounted in fixed positions; some of them can be driven in rotation by a motor not illustrated.

The impressing station 16 includes a robust supporting roll 35 mounted at right angles to the boundary 33, behind the fourth upper roller 32, and an impressing roll 36 which is partially hidden by the supporting roll 35 in FIG. 1. The impressing roll 36 carries two circular cutters 37. Supporting roll 35 and impressing roll 36 can be driven in rotation at a speed adapted to the circumferential speed of the lower rollers 31 and impress a tear-off strip 11 in each sheet-metal member 10 travelling through between them, the impression being parallel to its longitudinal edges.

The positioning device 17 includes pusher dogs 42 which are disposed in pairs and which are movable stepwise in the conveying direction of the sheet-metal conveyor 15. During each working cycle of the welding machine, two pusher dogs 42 engage behind a sheet-metal 10 which has travelled through between supporting roll 35 and impressing roll 36, and push the sheet-metal member 10 in succession into two precisely predetermined positions 10' 10", of which the first position 10' lies within the range of action of an impressing tool 43 while the second position 10" is situated in the welding station 19. Stops 48, which are disposed at the side and can be pressed pneumatically, ensure that the sheet-metal member 10 bears against the lateral boundary 33 in both positions 10' and 10". In the position 10', the impressing tool 43 impresses a transverse scoring across the tear-off strip 11, which scoring is intended to facilitate the initial tearing of the tear-off strip 11 when a can produced from the sheet-metal member 10 is opened. The arrival of a sheet-metal member 10 in the position 10' is detected by a sensor 44 which is of any known type in principle.

The tongue conveyor 18 includes a substantially horizontal circular plate 51 which can be rotated step-by-step, through 30° at a time, about a vertical axis A and comprises a receiver 52, open at the top, for a tongue 12, likewise at each circumferential distance of 30°. Leading into each receiver 52 is a suction duct 54 which is connected to a source of reduced pressure. The plate 51 is secured to a vertical shaft 55 which can be driven in rotation through a transmission 56 and can be raised and lowered by a lifting device 57.

Guided tangentially to the circular plate 51 is a sheet-metal strip 58 on which tongues 12 are prestamped at predetermined distances apart. The free end of each tongue 12 is folded back in the form of a triangle. The sheet-metal strip 58 can be moved stepwise in its longitudinal direction so that, during each working cycle of the welding machine, the foremost tongue 12, which is still connected to the sheet-metal strip, comes to lie above one of the receivers 52 in such a manner that this tongue extends radially in relation to the axis A as shown in FIG. 2 and its folded-back end lies radially outside the receiver 52 in question. The radially inner end of this tongue 12, which is still connected to the sheet-metal strip 58, lies between a die plate 59 and a punch 60 which is movable up and down and which parts off the tongue from the sheet-metal strip 58 and deposits it in the associated receiver 52 where it is held by the reduced pressure of the suction duct 54.

In the welding station 19, two welding electrodes 62 and 63 are disposed vertically one above the other. Disposed between the upper welding electrode 63 and the sheet-metal member 10 positioned beneath it and between the lower welding electrode 62 and the tongue 12 still held above it in the said receiver 52 in each case is a portion of an electrode wire 68 extending transversely to the tear-off strips 11. The electrode wire 68 has a flattened, rectangular-like cross-section and is guided over guide rollers not illustrated and can be moved step-by-step.

During each working cycle of the welding machine, the lower welding electrode 62 executes an upward stroke during which a circuit is closed through the said two portions of the electrode wire 68 as well as the tongue 12 and the sheet-metal member 10, and the tongue 12 is welded to the tear-off strip 11 of the sheet-metal member 10 in question. Immediately afterwards, the tongue conveyor 18 executes a downward stroke so that it releases the tongue 12 welded on.

The sheet-metal strip 58 is withdrawn from a reel, not illustrated, and runs over a guide roller 81, as shown in FIG. 1, and then through a prestamping device 82 and a drive member 83 before it reaches the tongue conveyor 18 and the punch 60. In the prestamping device 82, the tongues 12 are prestamped in such a manner that they are still held together by a narrow marginal region of the sheet-metal strip 58 which passes through without interruption. In this remaining marginal region of the sheet-metal strip 58, the prestamping device 82 impresses markings 84 which, in the example illustrated, are formed by circular holes but might also be formed by impressions or teeth. One of each of the markings 84 is disposed precisely in the middle between two adjacent tongues 12, as can be seen in particular from FIG. 2.

The drive member 83 is a roll with pins 85 which are disposed radially at uniform angular distances apart and which each engage in one of the markings 84 as a result of which a fixed relationship is established between the forward movement of the sheet-metal strip 58 and the rotation of the drive member 83. The shaft 55 of the tongue conveyor 18 is connected to the drive member 83 through a transmission 86. In the example illustrated, the transmission 86 consist of a toothed-belt drive 87 and an angled drive 88 and ensures that there is a specific, precisely reproducible relationship between the rotation of the drive member 83 and hence also the forward movement of the sheet-metal strip 58 on the one hand and the rotation of the tongue conveyor 18 on the other hand.

The punch 60 is secured to a mounting plate 89 which can be moved up and down by a lifting device, not illustrated, in each of the stopping periods of the tongue conveyor 18 which is rotatable step-by-step. Suspended on the mounting plate 89 beside the punch 60 is a centering device 90 with a holding-down plate 91 which is guided on the punch 60 and supported on the mounting plate 89 through springs 92. Secured to the underside of the holding-down plate 91 are two vertical pins 93, the spacing apart of which is equal to the spacing between successive markings 84.

On each downward stroke of the punch 60, the two pins 93 engage in the two markings 84 at each side of that tongue 12 which is to be parted off from the sheet-metal strip 58 during the further downward stroke of the punch 60. In the lower dead center position of the punch 60, the holding-down plate 91 lies on that receiver 52 of the tongue conveyor 18 in which the punched-off tongue 12 is to be deposited.

In order to establish an accurate correlation between the positions of tongue 12 and receiver 52, the centering device 90 further has a fork-like portion secured to the mounting plate 89 with two tines 94 which slide down on lateral faces of the said receiver 52 during the downward stroke and each penetrates into a recess 95 in the plate 51 as illustrated in FIG. 2. During the upward stroke of the punch 60, the holding-down plate 91, together with the reduced pressure prevailing in the receiver 52, ensures that the punched-off tongue 12 remains lying unmoved in the receiver.

As soon as the tines 94 have released the said receiver 52, the tongue conveyor 18 is turned through an angle of 30°, a tolerance of ±0.01° being adhered to. In this manner, the receiver 52 with the punched-off tongue 12 arrives in a checking station 96 in which it is ascertained, by conventional means, for example optical means, whether the tongue 12 is present. Should this not be the case, the machine would be switched off automatically.

In the event of a positive result of the check, the tongue conveyor 18 is turned through a further step of 30°, as a result of which the said receiver 52 with the punched-off tongue 12 arrives in a blow-out station 97. Here a compressed-air line ends which is controlled by a valve in such a manner that compressed air emerges and blows away the tongue 12 if a sheet-metal member 10 has not arrived in the position 10' in the positioning device 17 one step before the welding device 19 in the prescribed manner.

If the sensor 44 has confirmed the arrival of a sheet-metal member 10 in the position 10, the lateral stops 48 are actuated so that they press the sheet-metal members against the lateral boundary 33 in the positions 10' and 10". Following on this, the impressing tool 43 executes a working stroke as a result of which the tear-off strip 11 of the sheet-metal member is provided with its transverse scoring in the position 10'. Thereupon the pusher dogs 42 move each of the sheet-metal members 10 on by one step as a result of which the sheet-metal member just treated by the impressing tool 43 passes from the position 10' into the position 10". At the same time, the tongue conveyor 18 is turned on through a further 30° so that said receiver 52 with the punched-off tongue 12 arrives in the welding station 19 and can now be welded to the tear-off strip 11 of the sheet-metal member lying ready in the position 10".

The rest of the sheet-metal strip 58 freed from the tongues 12 is chopped up by a further punch device 98.

I claim:

1. A welding machine for welding a tongue (12) onto a sheet metal member (10), comprising:

a welding station;

a sheet metal conveyor (15) for rhythmically moving the sheet metal member through said welding station one behind the other;

a positioning device (17) for locating the sheet metal member at a welding position in said welding station;

a pre-stamping device for sequentially impressing in a sheet metal strip spaced tongues and corresponding markings at fixed distances from the tongues;

a drive means receiving said pre-stamped sheet metal strip for advancing said pre-stamped sheet metal strip by engaging said markings;

a punch means receiving from said drive means said pre-stamped sheet metal strip such that a foremost one of said markings which corresponds to a foremost one of said tongues engages a centering device, said punch means detaching said centered foremost tongue from said sheet metal strip at a punch position;

a tongue conveyor means including at least one tongue receiver adapted to receive and fixedly hold a punch tongue, said tongue conveyor means for locating said tongue receiver first at a punch position in registration with said punch means centering device and subsequently at said welding position in registration with a corresponding one of said sheet metal members, said welding position being separated from said punch position.

2. A welding machine as claimed in claim 1, which said prestamping device (82) is adapted for the simultaneous prestamping of at least one tongue (12) and at least one marking (84) in the form of a hole disposed midway between successive tongues.

3. A welding machine as claimed in claim 1, where said drive member (83) is constructed in the form of a roller with pins (85) for engagement in the markings (84).

4. A welding machine as claimed in claim 1, wherein said centering device (90), connected to the punch (60) is of fork-like construction with two tines (94) which engage, during each working stroke of the punch (60), round a receiver (52) of the tongue conveyor (18) which receives the foremost tongue (12).

5. The welding machine of claim 1 wherein said tongue conveyor means moves said punched tongue along an arc between said punch position and said welding station.

6. The welding machine of claim 5 wherein said arc substantially comprises 90 degrees.

* * * * *